United States Patent
Du et al.

(10) Patent No.: US 7,734,729 B2
(45) Date of Patent: Jun. 8, 2010

(54) SYSTEM AND METHOD FOR OBTAINING INFORMATION RELATING TO AN ITEM OF COMMERCE USING A PORTABLE IMAGING DEVICE

(75) Inventors: Kavin Du, Seattle, WA (US); Milen Nankov, Redmond, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 10/749,473

(22) Filed: Dec. 31, 2003

(65) Prior Publication Data

US 2005/0198095 A1    Sep. 8, 2005

(51) Int. Cl.
G06F 15/16 (2006.01)
G06F 17/30 (2006.01)
G06Q 30/00 (2006.01)

(52) U.S. Cl. .................. 709/219; 709/203; 705/26; 705/27; 707/10

(58) Field of Classification Search .................. 709/200, 709/203, 219; 705/26, 27; 707/10
See application file for complete search history.

(56) References Cited

U.S. PATENT DOCUMENTS

| | | | |
|---|---|---|---|
| 5,818,028 A * | 10/1998 | Meyerson et al. | 235/472.01 |
| 5,848,413 A | 12/1998 | Wolff | |
| 5,918,213 A * | 6/1999 | Bernard et al. | 705/26 |
| 5,933,829 A | 8/1999 | Durst et al. | |
| 5,978,773 A | 11/1999 | Hudetz et al. | |
| 6,053,408 A * | 4/2000 | Stoner | 235/462.22 |
| 6,108,656 A | 8/2000 | Durst et al. | |
| 6,199,048 B1 | 3/2001 | Hudetz et al. | |
| 6,434,561 B1 | 8/2002 | Durst, Jr. et al. | |
| 6,542,933 B1 | 4/2003 | Durst, Jr. et al. | |

(Continued)

FOREIGN PATENT DOCUMENTS

EP    1465071 A2    10/2004

(Continued)

OTHER PUBLICATIONS

Baig, E.C., "Radical Gizmos Arrive at Demo Conference," *USA Today: CyberSpeak*, Feb. 13, 2002, <www.usatoday.com/tech/columnist/2002/02/13/baig.htm> [retrieved Oct. 15, 2004].

(Continued)

*Primary Examiner*—Ranodhi N Serrao
(74) *Attorney, Agent, or Firm*—Christensen O'Connor Johnson Kindness PLLC

(57) ABSTRACT

A method, system, and apparatus are provided for allowing users to readily obtain information associated with a selected item from a remote location. More specifically, a user at the location of the first entity operates a portable imaging device to capture an image of identifying data, such as a barcode, that identifies a selected item. The captured image is then communicated to a server operated by a second entity that is different than the first entity to obtain item information (e.g., price, availability, etc.) associated with the selected item. The item information is communicated back to the portable imaging device for display to the user while the user remains at the location of the first entity. In other embodiments, the information extracted from the captured image may also be used to forecast future purchasing activity for the selected item.

35 Claims, 6 Drawing Sheets

U.S. PATENT DOCUMENTS

| | | | |
|---|---|---|---|
| 6,543,052 B1 | 4/2003 | Ogasawara | |
| 6,611,881 B1* | 8/2003 | Gottfurcht et al. | 710/18 |
| 6,616,049 B1 | 9/2003 | Barkan et al. | |
| 6,832,729 B1* | 12/2004 | Perry et al. | 235/472.01 |
| 2001/0011276 A1 | 8/2001 | Durst, Jr. et al. | |
| 2001/0032252 A1 | 10/2001 | Durst, Jr. et al. | |
| 2001/0044747 A1* | 11/2001 | Ramachandran et al. | 705/16 |
| 2001/0047428 A1 | 11/2001 | Hunter | |
| 2001/0054008 A1 | 12/2001 | Miller et al. | |
| 2002/0002496 A1 | 1/2002 | Miller et al. | |
| 2002/0003166 A1 | 1/2002 | Miller et al. | |
| 2002/0007307 A1 | 1/2002 | Miller et al. | |
| 2002/0007331 A1* | 1/2002 | Lo et al. | 705/36 |
| 2002/0016750 A1 | 2/2002 | Attia | |
| 2002/0022963 A1 | 2/2002 | Miller et al. | |
| 2002/0022992 A1 | 2/2002 | Miller et al. | |
| 2002/0022993 A1 | 2/2002 | Miller et al. | |
| 2002/0022994 A1 | 2/2002 | Miller et al. | |
| 2002/0022995 A1 | 2/2002 | Miller et al. | |
| 2002/0023959 A1 | 2/2002 | Miller et al. | |
| 2002/0026357 A1 | 2/2002 | Miller et al. | |
| 2002/0026358 A1 | 2/2002 | Miller et al. | |
| 2002/0026369 A1 | 2/2002 | Miller et al. | |
| 2002/0029181 A1 | 3/2002 | Miller et al. | |
| 2002/0030105 A1 | 3/2002 | Miller et al. | |
| 2002/0046093 A1 | 4/2002 | Miller et al. | |
| 2002/0065717 A1 | 5/2002 | Miller et al. | |
| 2002/0068991 A1* | 6/2002 | Fitzsimmons, Jr. | 700/214 |
| 2002/0072970 A1 | 6/2002 | Miller et al. | |
| 2002/0082931 A1* | 6/2002 | Siegel et al. | 705/26 |
| 2002/0107861 A1* | 8/2002 | Clendinning et al. | 707/101 |
| 2002/0125324 A1* | 9/2002 | Yavid et al. | 235/462.45 |
| 2003/0063575 A1* | 4/2003 | Kinjo | 370/265 |
| 2003/0115152 A1* | 6/2003 | Flaherty | 705/65 |
| 2003/0121981 A1* | 7/2003 | Slutsky et al. | 235/462.45 |
| 2003/0208396 A1 | 11/2003 | Miller et al. | |
| 2005/0015311 A1* | 1/2005 | Frantz et al. | 705/26 |
| 2005/0049907 A1 | 3/2005 | Kumar et al. | |

FOREIGN PATENT DOCUMENTS

| | | |
|---|---|---|
| WO | 0142894 A1 | 6/2001 |
| WO | WO 02/15118 A1 | 2/2002 |
| WO | WO 02/15120 A1 | 2/2002 |

OTHER PUBLICATIONS

"Bango.net: Camera-Enabled Mobiles and PDAs Scan Barcodes for Instant Access to WAP," *Cambridge 3G*, Sep. 10, 2002, <www.cambridge3g.com/pooled/articles/BF_NEWSART/view.asp?Q=BF_NEWSART_36234> [retrieved Oct. 15, 2004].

"Bookstores Tap Amazon.com Info," Jul. 25, 2003, *Channel NewsAsia*, <www.channelnewsasia.com/stories/technologynews/view/45292/1/html> [retrieved Jul. 28, 2003].

"Camera Phone Clicks as a Credit Card," Jul. 30, 2003, *CNETAsia* [online], [retrieved Aug. 1, 2003].

"Camera Phones Used to Check Football Membership Cards," Jan. 28, 2004, <www.cellular-news.com/story/10508_print.shtml> [retrieved Feb. 17, 2004].

"Finnish Lapland—More Than Meets the Eye," *e.Finland—Technology Serving People*, Mar. 20, 2003, www.e.finland.fi/netcomm/news/showarticle.asp?intNWSAID=13208 [retrieved Oct. 15, 2004].

GeraCap BarReader, GeraCap Oy (Symbian Platinum Partner), Seinäjoki, Finland, www.barreader.com, 2-page brochure.

Gilbert, A., "MIT to Uncork Futuristic Bar Code," Aug. 29, 2003, *CNET News.com: Tech News First* [online], [retrieved Sep. 3, 2003].

"Lavasphere SDK—Software Enabling Mobile Camera Phones to Read Bar Codes and 2d Codes," *Press Release*, © 2004 Gavitec AG—Mobile Digit, Feb. 21, 2002 [retrieved Oct. 15, 2004].

Marek, S., "Camera Phones Capture Bar Codes," Feb. 15, 2004, *Wireless Week*, <www.wirelessweek.com/index.asp?layout=articlePrint&articleID=CA381641> [retrieved Feb. 17, 2004].

*Red Ferret Journal, The* [online blog], Feb. 23, 2002, <www.enorgis.com/arc20020217.htm> [retrieved Oct. 15, 2004], 7 pages.

ScanImage™ 1470B, Intermec, www.intermec.com/cgi-bin/ASP/Print_ProductsShowdetail.asp?Category=SCAN&Family=SCA... [retrieved Dec. 30, 2003], 3 pages.

"ScoutPal.com: Advanced Tools for Amazon Sellers," © 2002-2005 ScannerPal, Inc., <www.scoutpal.com> [retrieved Sep. 9, 2005].

Soto Ouchi, M., "Small Sellers Get the Amazon.com Edge," Jun. 7, 2004, *The Seattle Times*, <seattletimes.nwsource.com/html/businesstechnology/2001949623_amazonweb07.h5ml> [retrieved Sep. 9, 2005].

Sundgot, J. (ed.), "Point and Receive With a Twist," *infoSync World*, Jan. 8, 2002, <www.infosyncworld.com/system/print.php?id=2131> [retrieved Oct. 15, 2004].

"VisionSpy 2300M—The Off-the-Shelf Code Reader to Read Barcodes and 2d Codes From Any Mobile Phone Display," *Press Release*, © 2004 Gavitec AG—Mobile Digit, Feb. 21, 2002 [retrieved Oct. 15, 2004].

Supplementary European Search Report mailed Jan. 23, 2009, issued in corresponding Application No. EP 04815119, filed Dec. 22, 2004, 3 pages.

\* cited by examiner

SYSTEM AND METHOD FOR OBTAINING INFORMATION RELATING TO AN ITEM OF COMMERCE USING A PORTABLE IMAGING DEVICE

FIELD OF THE INVENTION

The present invention is directed to the fields of electronic commerce and software, and in particular, to a method and system for communicating and obtaining information related to an item of commerce using a portable imaging device.

BACKGROUND OF THE INVENTION

In the retail industry, effective and timely communication of product information is essential to both merchants and consumers. For consumers, there is a need for effective and timely communication of product information for those in search of the best price for a desired product. For merchants, there is a need for effective and timely communication of product information for effective advertising of competitive prices, sales, promotions, new products, etc. In addition, both merchants and consumers benefit when merchants are able to collect and analyze sales and other information to forecast future sales. Accurate sales forecasting enables a merchant to effectively select and stock products to meet consumer demands. In response to a long-standing need for improved communication between merchants and consumers, many companies have contributed to the growth and development of the Internet and electronic commerce systems. Given the current state of the art, it is well known that existing electronic commerce systems have greatly enhanced many aspects of the retail industry and commerce in general.

While electronic commerce has improved the way consumers shop for products, services, or other commerce items, existing systems present some limitations. For instance, most consumers have access to detailed product information only at their home or office because they search for such information using a personal computer or a television set-top box. Consumers desiring to search for such information remotely must use a wireless-enabled personal digital assistant (PDA) or a mobile telephone. Since most PDAs and mobile phones require the tedious task of entering data by the use of an abbreviated keypad, users may not be able to easily or quickly search for product information.

Given the above-described limitations, consumers cannot readily compare prices of on-line products while shopping in a local retail store. For example, if a consumer is shopping at a retail book store, he or she may be interested in comparing the price of a particular book to prices offered by on-line retailers. To do so using a portable wireless device, the consumer would have to manually enter one or more pieces of identifying information, e.g., the title, author, ISBN, etc., in order to search for the book. Such data entry can be a long and tedious process. Alternatively, the consumer can write down all of the information and look up the book when they return to their home or office computer. Such method is inherently inefficient, however, since the consumer may then have to return to the store if the price at the store is subsequently found to be lower than prices available online.

In addition to the above-described limitations, existing systems are also limited to specific types of data collection used for purchase forecasting. As will be appreciated by those of ordinary skill in the art, many merchants find it helpful to have an accurate forecast of future purchasing activity for products or other commerce items.

SUMMARY OF THE INVENTION

The present invention provides interactive merchandising programs that, in some embodiments, are particularly suited for improved communication of information associated with commerce items. In accordance with one aspect, the present invention provides a system and method for allowing consumers to obtain information associated with a particular item, e.g., price, availability, reviews, etc., by the use of a portable imaging device, such as a digital camera, mobile telephone, portable computing device (e.g., PDA), etc., having a component capable of capturing an image. In one exemplary embodiment, a consumer may use the camera of a mobile telephone to capture an image of a desired item. The image is communicated to one or more servers, and data identifying the desired item is extracted from the image. The identifying data extracted from the image may be information such as a Universal Product Code (UPC), text on the box of the product, indicia on the product itself, etc. The identifying data may be extracted from the image using any one of many standard image recognition and processing programs. The data identifying the selected item is then used to query one or more resources to obtain item information related to the selected item, such as the item's price, ratings or reviews, and availability. The obtained information is then communicated to the mobile phone. The item information may be displayed on a display screen of the mobile phone or may be issued as an audible signal via a speaker of the mobile phone. Among many other benefits, the present invention allows users to readily obtain item information, even if they are located in a remote location.

The foregoing embodiment describes one implementation of a method for communicating information regarding a desired item. The method includes obtaining an image of an item using an imaging device, wherein the image contains identifying data associated with the item as provided by a first entity (e.g., a brick-and-mortar retail store). The method then extracts identifying data for the item from the image. Item information, such as the item's price, availability, etc., are obtained from a resource by a second entity (e.g., an online retail store) using the identifying data. The second entity is different than the first entity and may be situated at a location remote from the first entity. The item information is then communicated from the second entity back to the imaging device for communication through an output of the imaging device, such as a display or a speaker, while the imaging device (and user) remain present at the location of the first entity.

In accordance with another aspect of the present invention, data received from a number of different portable imaging devices is collected and processed to facilitate sales forecasting analysis. Data is collected when users of portable imaging devices submit a request for information related to an item. The collected data may be used to generate sales forecasting reports to determine market demand for various items. In one example, a consumer may use the camera of a mobile phone to capture an image of a barcode or other identifying data associated with a desired item. The image is then communicated to a server, where the identifying data is extracted from the captured image to identify the selected item. The number of times that all consumers take a picture of a particular item is stored in a database and used to generate sales forecast reports. Such reports may assist merchants accurately forecast future purchasing activity for products or other commerce items. The fact that an individual consumer identified a particular item may also be stored in a database associated with the consumer and used to predict the purchasing behavior of the consumer, thereby improving future shopping experiences for the consumer by anticipating, as best possible, the consumer's purchasing interests.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following description of the present invention provides an overview of a computer system and method for communicating information regarding a selected item by using an imaging device in communication with a server. In accordance with one aspect, the present invention provides a system and method that allows consumers to obtain information associated with a particular item, e.g., price, availability, ratings, reviews, etc., by using an integrated portable imaging device, such as a digital camera, mobile telephone, portable computing device (e.g., PDA), etc. For example, in one implementation of the invention, a consumer at the location of a first entity (e.g., a brick-and-mortar retail store) may use the camera of a mobile telephone to capture an image of a desired item as provided by the first entity. The image is then communicated to a server operated by a second entity (e.g., an online retail store) that is different than the first entity. The image is analyzed and data identifying the selected item is extracted from the image. Such identifying data may include the Universal Product Code (UPC), text on the packaging of the product, indicia on the product itself, etc. The identifying data may be extracted from the image using any one of many standard image recognition and analysis programs. The identifying data is then used to query one or more resources to obtain information related to the selected item, such as the item's price and availability. The obtained item information is communicated from the second entity to the mobile phone, where it may be displayed on a display screen or issued as an audible signal via a speaker, while the mobile phone (and the user) remain at the location of the first entity. In addition to communicating the item information to the mobile phone, information related to the selected item is processed by the server to generate sales forecast reports. The illustrative examples described herein are not intended to be exhaustive or to limit the invention to the precise forms disclosed. Similarly, any process steps described herein may be interchangeable with other steps, or several combinations of steps, in order to achieve the same result.

Figure 1:
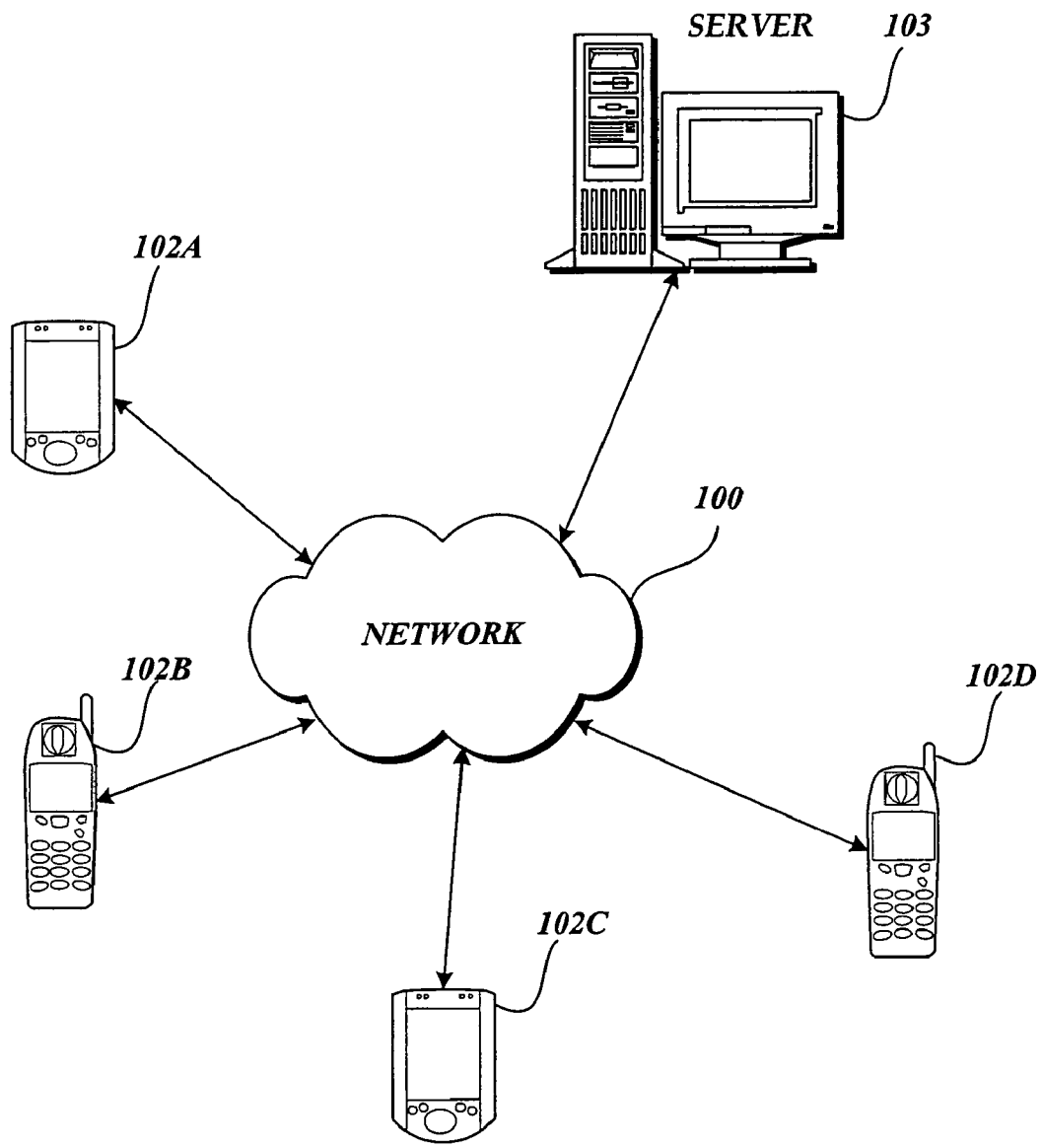
FIG. 1 is a pictorial diagram of a number of devices connected to a network, including a number of imaging devices in communication with a server.

Referring to FIG. 1, the following description is intended to provide an exemplary overview of one environment in which the invention may be implemented. In this environment, a plurality of imaging devices 102A, 102B, 102C, 102D (present at the location of one or more first entities) are configured to electronically communicate with a server 103 operated by a second entity via a network 100. Although a specific network configuration is shown in FIG. 1, it will be appreciated that the imaging devices may be configured to communicate with the server 103 through other communication configurations. For example, an imaging device may communicate data with a computer (not shown) via a port, such as a USB or a IEEE 1394 port. In turn, the computer may then communicate the data communicated through the port with the server 103 via a network or other data connection.

The server 103 may be a computer that is associated with a store or other entity that provides goods and/or services to others, whether retail, wholesale or otherwise, or any other entity that provides information about goods available to consumers. The network 100 may be a local area network (LAN) or a larger network, such as a wide area network (WAN) or the Internet. In FIG. 1, the imaging devices are illustrated as portable computers 102A and 102C, and mobile telephones 102B and 102D. However, the imaging devices 102A, 102B, 102C, 102D shown in FIG. 1 may take the form of any one of a number of different computer products that includes appropriate hardware and software components for capturing an image. An image, in this context, is a two-dimensional array of pixels, and does not include one-dimensional data obtained from a laser scanner or light pen. For example, the imaging device may be a digital camera, a mobile telephone, a portable computing device, or any other device having a component capable of capturing an image. One example of a digital camera that may be used in the invention is Fuji Fine Pix 30i that is capable of immediately downloading and communicating an image using a compatible cell phone. Examples of mobile telephones with imaging components include the Motorola T722i, Samsung e715, Nokia 3650, and Ericsson T616 phones. An example of a portable computing device with an imaging component is the Handspring Treo 600 available from palmOne, Inc. Obviously, these imaging devices should be considered as exemplary and not limiting to the invention. As will also be appreciated by those skilled in the art, the configuration shown in FIG. 1 provides a simplified example for one implementation of the present invention. The present invention is not limited to this type of configuration.

As will be described in more detail below, a consumer can use an imaging device, such as device 102B, to capture an image of an item, with identifying data such as a barcode or product title of the item, while shopping at a local retail store. The imaging device then communicates the captured image to the server 103 (operated by an entity that is different than the local retail store), where the identifying data is extracted from the image using any one of many standard image recognition and analysis programs. For example, where the identifying data in the image is in an alphanumeric text format, an optical character recognition (OCR) program may be employed to extract the identifying data. Where the identifying data is a graphical code such as a bar code, a standard barcode extraction program may be used to read the barcode image and translate it to an alphanumeric code, such as a universal product code, for the item. The identifying data is then used to query one or more resources to obtain item information (e.g., price, reviews, availability, etc.) associated with the selected item. The server 103 communicates the item information back to the imaging device for display to the consumer while the consumer remains at the location of the local retail store. Using the invention, the consumer may readily compare the price offered by the local retail store to using to prices offered by other on-line retailers, or read the reviews of the product to help the consumer in making a purchasing decision.

Figure 2A:
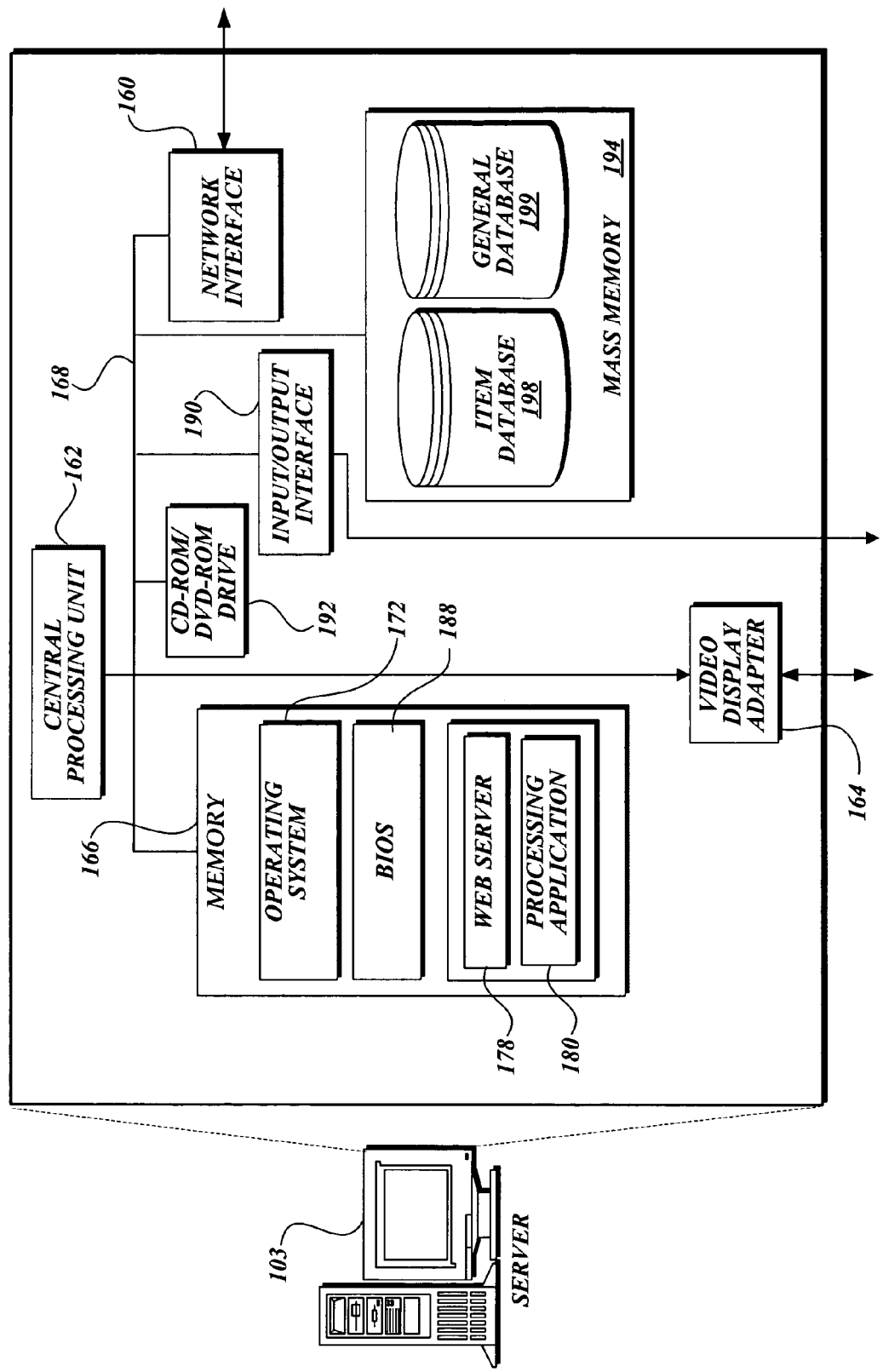
FIG. 2A is a schematic block diagram of an exemplary computer architecture for the server depicted in FIG. 1.

The various hardware and software components of the server 103 and the imaging devices 102A, 102B, 102C and 102D that are used to receive, store, and process the previously described data will now be discussed in more detail. FIG. 2A depicts an exemplary computer architecture of the server 103 shown in FIG. 1. Those skilled in the art will appreciate that the server 103 may include more or fewer components than those shown in FIG. 2A. However, it is not necessary that all of these generally conventional components be shown in order to disclose an enabling embodiment of the present invention. As shown in FIG. 2A, the server 103 is connected to the network 100 (FIG. 1) via a network interface 160. Those skilled in the art will appreciate that the network interface 160 includes the necessary hardware and software for allowing the server 103 to communicate with other computers connected to the network by the use of one or more suitable communication protocols, such as the TCP/IP protocol.

The server 103 also includes a processing unit 162, a video display adapter 164, and memory 166, all connected together and to the network interface 160 by a bus 168. The memory 166 generally comprises RAM, ROM, and permanent memory, such as a hard disk drive, tape drive, optical drive, floppy disk drive, or combination thereof. The memory 166 stores an operating system 172 for controlling the operation of the server 103. As is known to those skilled in the art, the operating system may be formed by a general-purpose server operating system such as a Microsoft® server operating system, UNIX, or LINUX™. A binary input/output system ("BIOS") 188 for controlling the low-level operation of server 103 is also stored in the memory 166.

The memory 166 may also store program code and data for providing a Web site that allow users to request, receive, and view information and data files stored in the server 103. Thus, the memory 166 may store a Web server application 178 that may be any one of a number of commercially available software packages. The Web server application 178 comprises computer executable instructions that, when executed by the server 103, generate configurable markup documents, such as the sample markup document shown in FIG. 4B, which are described in more detail below. The memory 166 also stores other software components, such as a processing application 180, to facilitate various functions of the present invention. As will be described in more detail below, the processing application 180 is configured to receive images from imaging devices, extract identifying data from the images, query a database for item information and communicate database query results to the imaging devices. The processing application 180 is also configured to store data, whether it be the received image, extracted identifying data, or item information, for the generation of forecast reports.

The server 103 may also include an input/output interface 190 connected to the bus 168 for communicating with external devices, such as a mouse, keyboard, scanner, or other input devices not shown in FIG. 2A. Likewise, the server 103 may further include additional mass storage facilities, such as CD-ROM/DVD-ROM drive 192, and large capacity mass memory 194, also connected to the bus 168. The mass memory 194 may be utilized by the server 103 to store several databases. In particular, the mass memory 194 may contain or have access to an item database 198 for use by the processing application 180. As will be appreciated by those skilled in the art, the item database 198 may be configured to contain data in any one of a number of formats suitable for storing information related to commerce items. For instance, the item database 198 may be configured to store item information describing the price of an item, the availability of an item, customer reviews of an item, or any other like data. The item database 198 may also contain advertisements about a particular item, news articles, and other product-related information.

The mass memory 194 may also contain or have access to a general database 199 for use by the processing application 180. The general database 199 may be configured to contain other types of information, such as information related to users of the website operated by the Web server 178, the purchase history or query history of the users, and other like information.

As described in more detail below, information stored in the item database 198 and general database 199 may be communicated to one or more imaging devices for display to users. Although this illustration includes examples of specific software applications and databases, this illustration should be taken as exemplary and not limiting.

Figure 2B:
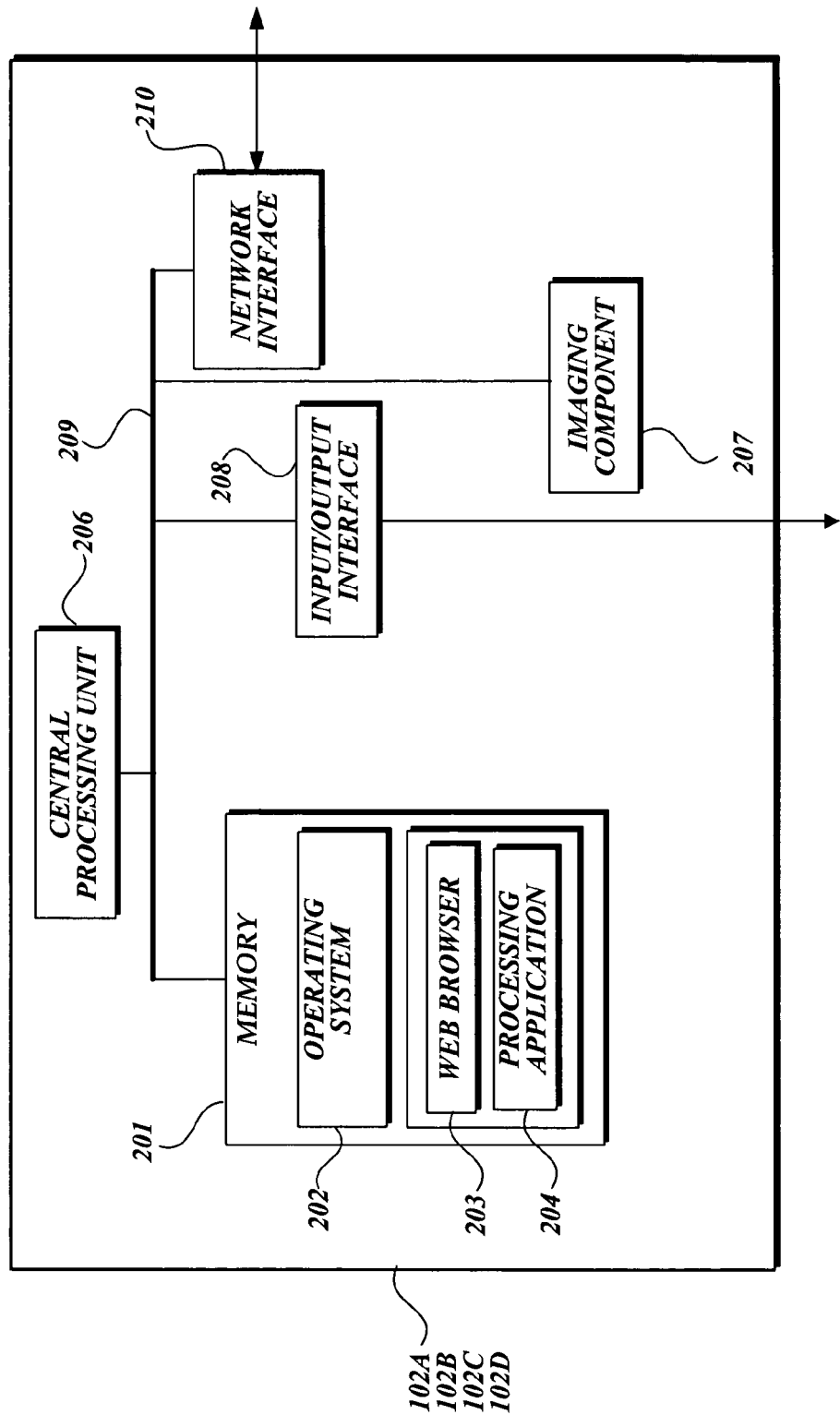
FIG. 2B is a schematic block diagram of an exemplary architecture for one imaging device in FIG. 1.

As will be appreciated by those skilled in the art, the architecture of the imaging devices 102A, 102B, 102C, 102D may take on any suitable form, such as the architecture illustrated in FIG. 2B, if appropriate. For example, an imaging device may include a network interface 210 for providing communication with the network 100. The network interface 210 may be configured for use with any wired or wireless network connection, and may be used with any suitable communication protocol, such as the TCP/IP protocol. In general, the imaging device includes a central processing unit 206, an imaging component 207, an input/output interface 208 and memory 201, all connected together and to the network interface 210 by a bus 209. The memory 201 stores the program code, such as an operating system 202, necessary for operating the imaging device and for generating an interface, such as a graphical user interface (GUI) on a display of the imaging device. The memory 201 may also store a Web browser application 203, such as Microsoft Internet Explorer®, for browsing Web pages generated by remote servers, such as server 103.

The imaging component 207 may include a charge coupled device (CCD) or any other circuit suitable for capturing an image of an item that includes identifying data, such as a barcode or text information. Portable electronics with imaging components, such as mobile phones, PDAs, game machines, and digital cameras, are presently known and understood in the art of image capture and communication. The imaging device may further comprise one or more input/output devices 208, which may include a display, a speaker, or any other device for communicating information. Accordingly, the imaging device may also contain software components, such as a processing application 204, for converting electronic signals into audible signals suitable for communicating information through a speaker.

Figure 3:
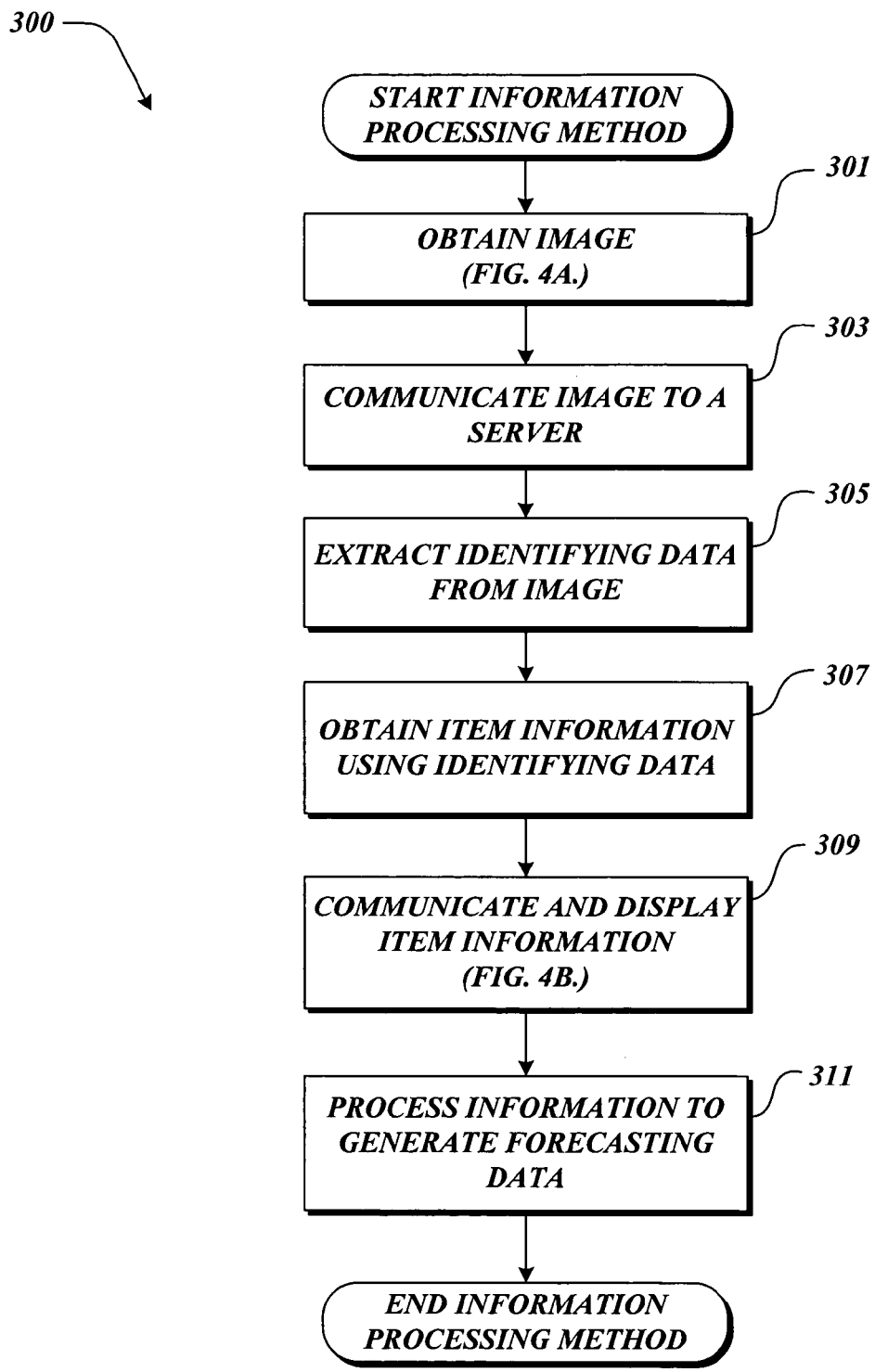
FIG. 3 is a flow diagram illustrating an exemplary method for communicating price information and projecting future purchasing activity for an item.
Figure 4A:
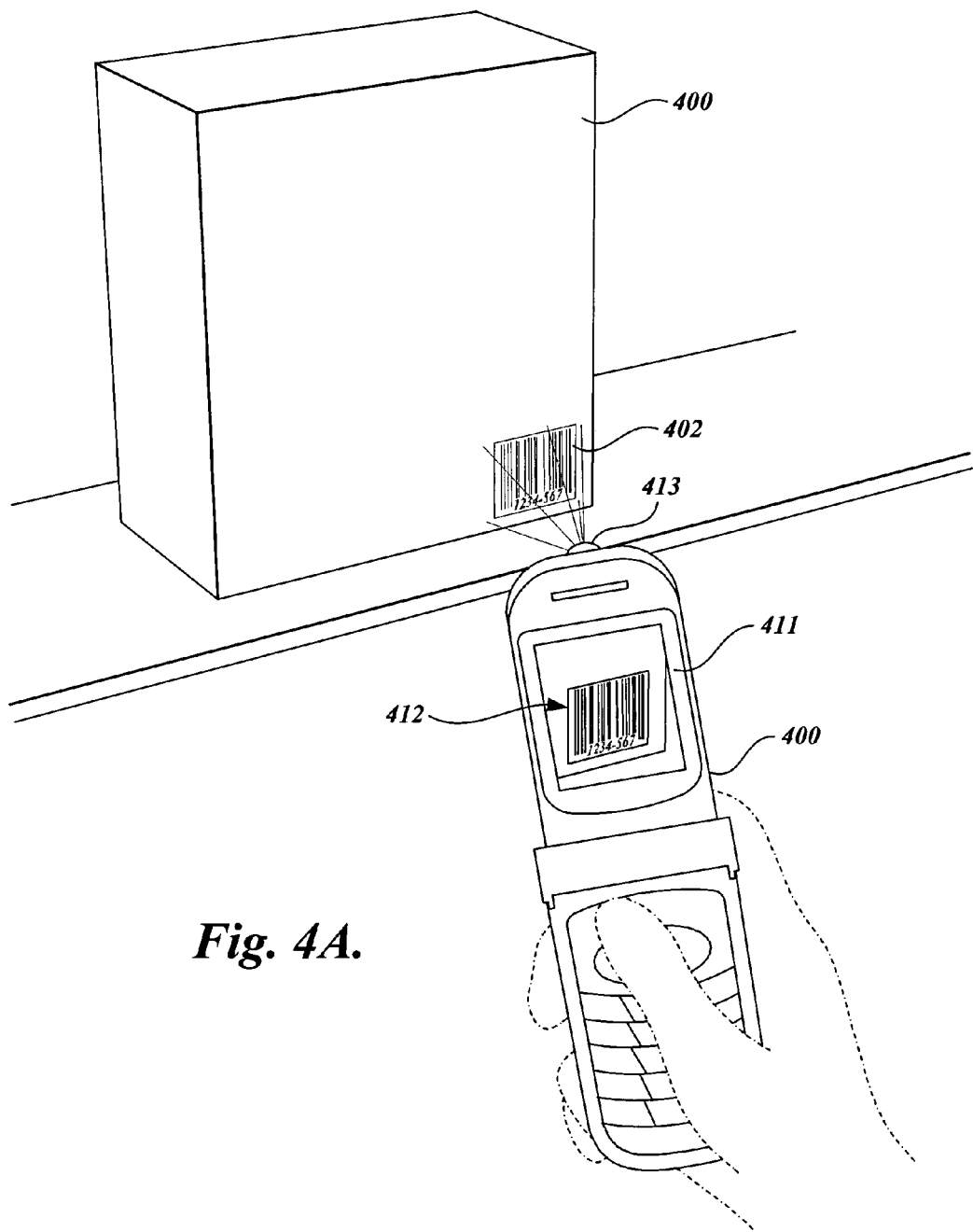
FIG. 4A is a pictorial diagram illustrating an exemplary imaging device for obtaining an image of information identifying an item of commerce.
Figure 4B:
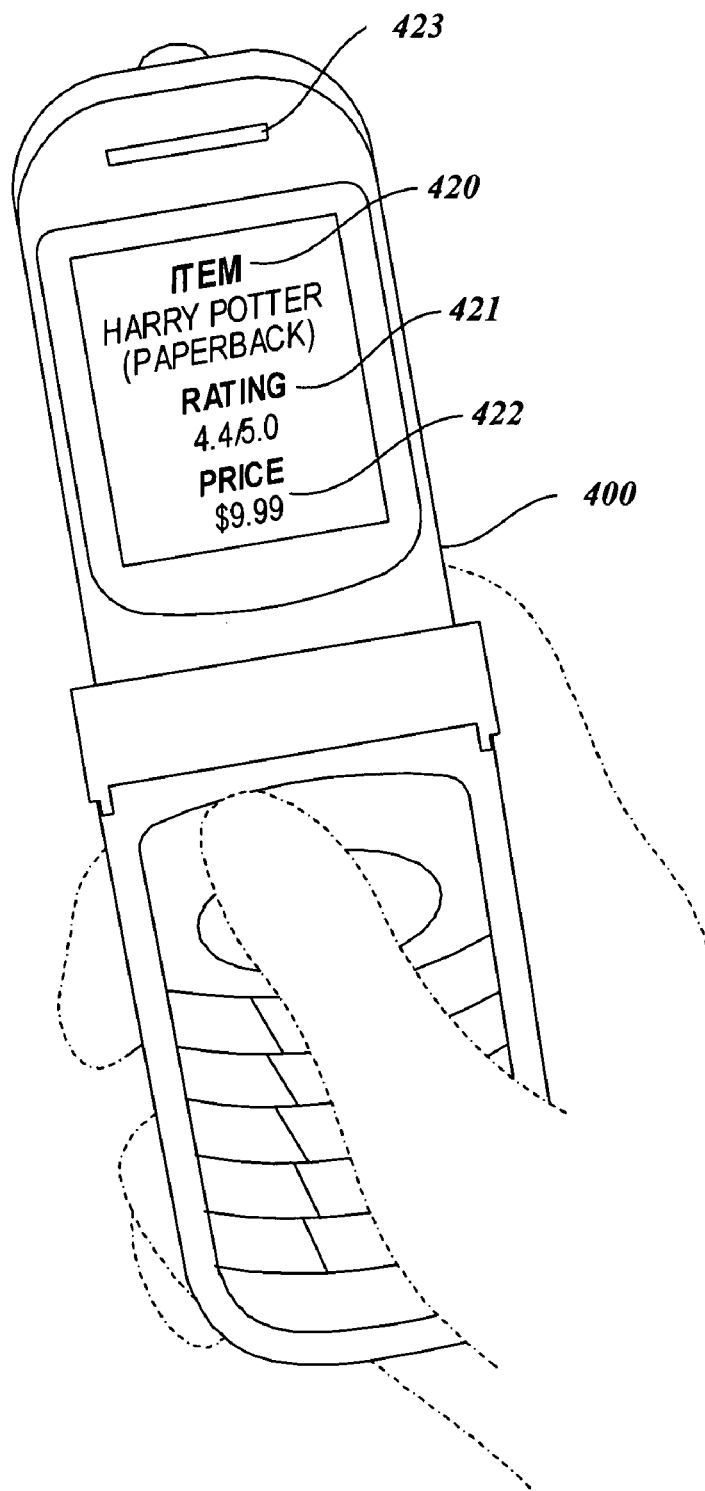
FIG. 4B is a pictorial diagram illustrating an exemplary display of price and product information related to an item of commerce on the imaging device shown in FIG. 4A.

Referring now to the flow diagram of FIG. 3 and the pictorial diagrams of FIGS. 4A and 4B, one exemplary embodiment of an information processing method 300 will now be described. In this description, the information processing method 300 processes an image to identify the item identified by the image and returns to the user information pertaining to the identified item. The information processing method 300 also collects item information for use in generating individual user profiles or aggregate sales forecasting reports. The information processing method 300 begins at block 301, where an image of an item is obtained from an imaging device, such as a mobile phone (as shown in FIG. 4A). The image contains identifying data, such as a barcode of a UPC, the text of the UPC, and/or any other suitable identifier, such as a two-dimensional barcode, text describing the item, etc.

FIG. 4A illustrates a perspective view of one suitable arrangement for capturing an image containing identifying data about a selected item. As shown, a mobile phone 400 having a camera 413 is used to capture an image 412 of identifying data 402 of an item 401. In this example, the camera 413 is directed to the barcode 402 of the item 401 for capturing the image of the barcode 402. In other instances, the camera 413 may be directed to a label, sign, or advertising that includes identifying data of a selected item, even if the selected item is physically present or not. In yet other instances, the camera 413 may be directed to the product itself.

During operation of the camera 413, the image is captured by the camera 413 and stored in the memory of the camera 413. The captured image 412 may be depicted on the display 411 of the mobile phone 400. Although the exemplary embodiment described herein utilizes a mobile phone 400, those of ordinary skill in the art will appreciate that the present invention extends to any imaging device capable of capturing an image regardless of the type, configuration, or size of the device and/or computer system.

The image 412 may comprise either a gray scale image or a color image. In addition, the image generated in the process of block 301 may be in any format, and may also include full-motion video images in addition to, or instead of, a still image. Accordingly, the imaging device used in this part of the information processing method 300 may include a still digital camera, a video camera or any other type of device that captures, stores, and communicates images.

Returning to FIG. 3, after the image is captured and stored in the memory of the imaging device, the information processing method 300 continues to block 303 where the image is communicated to a server, e.g., server 103. Depending on the type of imaging device, communication of the image from the device to the server may be performed using any one of a number of different communication networks or technologies. Examples of suitable wireless communications networks/technologies include, but are not limited to, wireless telephony ("cellular") including analog cellular, digital personal communications service ("PCS"), short message service ("SMS"), and wireless application protocol ("WAP"). Other suitable wireless communication networks/technologies include, but are not limited to, wireless digital data networks, such as 802.11 wireless LAN ("WLAN"), two-way paging networks, specialized mobile radio systems, infrared, and nonlicensed ISM-service communications links, such as Bluetooth. Examples of suitable wired communications networks include a public switched telephone network ("PSTN"), wired digital data networks, such as the Internet, or a local area network ("LAN"), etc. One skilled in the relevant art will appreciate that additional or alternative, wired or wireless, communication networks/technologies may be practiced and are considered within the scope of the present invention.

At block 305, the data identifying the selected item is extracted from the image. Those skilled in the art will recognize that the extraction process will depend upon the type of image that is received. If the image contains a barcode, an image processing program using edge detection routines is used to locate the barcode and convert the barcode to the equivalent numeric or other code that is represented by the barcode. Image processing programs of this type are commonly employed in barcode scanners having image capture technology, such as the ScanImage™ 1470B offered by Intermec, Inc. (www.intermec.com), and may be adapted for use in the present invention. If the image contains text (such as the cover of a book), a commercially-available optical character recognition (OCR) program may be used parse the image and extract such identifying data as the name of the author, title of the work, etc. In other embodiments, the image may contain a graphic design, such as a symbol or trademark, that may be extracted and correlated with known graphic designs stored in a database to identify the selected item. Other commercially available video or image recognition programs may be used in the alternative to obtain the identifying data, which may include, for example, numeric or alphanumeric data containing a UPC or SKU associated with the selected item.

In some circumstances, an image may contain multiple instances of identifying data, such as a barcode and a title or description of the item. In that regard, the image may be parsed by more than one recognition program as described above. For example, barcode scanning software is trained to ignore text and instead read programmed barcode designs. OCR programs are designed to identify and recognize text. In situations where separate instances of identifying data in an image are parsed and recognized by different programs, the output of the different recognition programs may be judged for quality and the best identifying data is used. Alternatively, the output of one recognition program may be used to corroborate the output of another. For example, if a barcode recognition program applied to an image returns a valid UPC and an OCR program returns text that fails to describe any known item, the UPC data is determined best and is used in querying for further item information. If a valid UPC is obtained from the image and an OCR program recognizes text describing a known item, the text recognized by the OCR may be used to confirm the identity of the item represented by the UPC (or vice versa). If conflicting identifying data is obtained, the user of the imaging device may be polled to determine the correct data, or item information related to all the identified items may be retrieved and communicated to the user.

Although in the illustrated embodiment of the information processing method 300 the identifying data is extracted after the image is communicated to a server, the identifying data may be extracted from the image before any data or information is communicated from the imaging device to the server. Accordingly, in other embodiments, the imaging device 400 may process the image to extract the identifying data and then communicate the identifying data to the server 103 for further processing. In such an alternative embodiment, the imaging device 400 may provide a mechanism that allows the user to review the identifying data, and edit or modify the identifying data if incorrect, before the identifying data is communicated to the server 103.

Once the image is communicated to the server 103 and the identifying data is extracted from the image, the method proceeds to block 307 where the identifying data is used to obtain information related to the selected item. In several non-limiting examples, the item information obtained in the process of block 307 may include price information, inventory information, product rating information, product review information, etc. The item information may also include other general information that may be related to the user of the camera 413 or other products. Such information may be used to provide product recommendations, which may be specific to a particular user.

The item information obtained in the process of block 307 may come from a number of resources. For instance, the item information may be obtained from a database, such as the item database 198 (FIG. 2A), and other general information may be obtained from another database, such as the general database 199 (FIG. 2A). Although this illustrative example shows two databases for storing information, it will be appreciated that the present invention may access information from a single database or a large number of databases stored on distributed resources. For example, the item information obtained in the process of block 307 may come from one or more Web services.

In one implementation of the process of block 307, the extracted identifying data is included in a standard database query sent to the item database 198 to obtain price and/or other information about the selected item (a.k.a. "item information"). For example, a query containing the UPC of a selected item may be used to obtain price and rating information for the selected item identified by the UPC from the item database 198. Those skilled in the art will recognize that virtually any type or quantity of information relating to the selected item may be obtained and communicated to the user in accordance with the present invention. Non-limiting examples of item information include price, availability, safety or recall information, recommendations, reviews, discount coupons associated with the item, popular press articles about the item, etc.

Once the item information is obtained, the information processing method 300 proceeds to block 309, where the item information is communicated to and displayed on the imaging device. Those skilled in the art will appreciate that any suitable communication network or technology, such as those described above, may be utilized to communicate the item information from the server 103 to the imaging device 400. FIG. 4B illustrates an exemplary display of the item information on the imaging device 400. In the illustrated example, the item information displayed includes the name 420, product rating information 421, and price 422 of the selected item. Although in the illustrated example item information includes product name, product rating, and price information, any type or amount of information related to a specific item may be communicated to and displayed on an imaging device. In addition (or alternative) to displaying the item information on the display, the item information can be converted to an audible signal suitable for communicating the item information through a speaker 423.

In other embodiments, the process of block 309 may include the communication and display of information obtained from multiple sources. For example, one embodiment may include the display of multiple price quotes from a number of different on-line retailers and/or Web services. The display may then allow users to conduct a side-by-side comparison of multiple price listings for the selected product. The display of such a price listing can be arranged in one of a number of different interfaces, including an interface that allows users to sort items by price, rating, etc.

Returning to FIG. 3, once the item information is communicated to and displayed by the computing device 400, the information processing method 300 proceeds to block 311 where the identifying data (extracted from the image in block 305) or the item information (obtained from a database in block 307) is further processed to generate individual or group forecasts of future purchasing activity for the selected item. For example, if an image of a product is received from a number of different imaging devices, a business entity can use the received information to generate reports to estimate consumer demand for the imaged product. More specifically, the received information can be used to generate sales forecast reports. Such reports may assist merchants to forecast future purchasing activity for products or other commerce items. Additional disclosure of suitable methods for generating forecasts of future purchasing activity is provided in U.S. patent application Ser. No. 10/647,975, entitled USING PAGE-VIEW DATA TO PROJECT DEMAND FOR AN ITEM, filed on Aug. 26, 2003, and incorporated by reference herein in its entirety. As disclosed in this application, browsing data, which may include image inquiries via an imaging device as disclosed herein, is used to project future browsing activity and future purchasing activity. In addition, details of historical data and forecast reports are also disclosed in this application. With reference again to FIG. 3, after the information processing method 300 generates data for forecasting future purchasing activity in block 311, the method terminates.

The process in block 311 also contemplates using the item's identifying data (extracted from the image in block 305) or the item information (obtained from a database in block 307) to forecast and encourage future purchasing activity by the individual consumer submitting the image. The identifying data (or item information) may supplement other information in a profile for the consumer, which can be used to prompt the presentation of one or more targeted offers to the consumer (e.g., a coupon for 10% off the particular item or accessories used with the item), and thereby enhance the consumer's shopping experience.

Although the illustrated embodiment of the present invention includes a forecasting process (block 311) after the price information is queried and communicated to the imaging device (blocks 307 and 309), it will be appreciated that the present invention includes other embodiments in which these processes are arranged in another order. For instance, the generation of forecast data (block 311) may occur before either or both processes of blocks 307 and 309. In addition, the generation of forecast data (block 311) may occur even if the processes of blocks 307 and 309 are not executed. Likewise, the information processing method 300 also includes embodiments where the item information is queried and communicated to the imaging device (blocks 307 and 309) without the generation of forecast data (block 311).

In one example of an alternative embodiment, when item information is communicated back to the user's mobile device, the user may be provided with a control that allows the user to immediately purchase the selected item from the online source. Existing software configured to execute electronic commerce purchase transactions can be used to implement such a feature.

While the foregoing description makes reference to several preferred and alternative embodiments, the scope of the invention is defined solely by the claims that follow and the elements recited therein. For example, embodiments that send batches of images, instead of individual images, are also within the scope of the present invention.

The embodiments of the invention in which an exclusive property or privilege is claimed are defined as follows:

1. A computer-implemented method for communicating information regarding a selected item to a user present at a location of a first retail entity from a second retail entity different from the first retail entity, wherein the selected item is available for purchase at the second retail entity, the method comprising:

while the user remains present at the location of the first retail entity, one or more processing components of a computer system operated by the second retail entity:

receiving an image from an imaging device of the user, wherein the image contains multiple instances of identifying data associated with the selected item;

for each of the multiple instances of identifying data, extracting the identifying data from the image using a data recognition procedure that produces an output;

comparing the output of each of the data recognition procedures to corroborate the identification of the selected item that is obtained from each instance of the identifying data;

determining whether the data recognition procedures output identifying data that is corroborated and based on that determination, when the identifying data is not corroborated, determining a quality of the output of each of the data recognition procedures and using identifying data of a higher quality output to obtain item information associated with the selected item, otherwise using the corroborated identifying data to obtain item information associated with the selected item;

communicating the item information directly from a server of the second retail entity to the imaging device of the user; and storing at least one of the instances of identifying data as profile information in a database associated with the user, wherein the profile information is used to anticipate the user's purchasing interests and provide one or more targeted offers to the user to purchase an item based on the user's anticipated purchasing interests.

2. The method of claim 1, further comprising formatting the item information for output on a visual display of the imaging device when the item information is communicated from the second retail entity to the imaging device.

3. The method of claim 1, further comprising formatting the item information for output on an audio speaker of the imaging device when the item information is communicated from the second retail entity to the imaging device.

4. The method of claim 1, wherein the imaging device is a digital camera capable of communicating the image containing the identifying data.

5. The method of claim 1, wherein the imaging device is a mobile telephone having a component for capturing an image containing the identifying data.

6. The method of claim 1, wherein the imaging device is a portable computing device having a component for capturing an image containing the identifying data.

7. The method of claim 1, wherein the method further comprises:

compiling historical data based on a number of times an image has been received from different imaging devices, said image containing identifying data associated with the selected item;

using the historical data to estimate consumer demand for the selected item; and generating a report that forecasts future purchasing activity for the selected item based on the estimated consumer demand.

8. The method of claim 1, wherein the item information comprises rating information for the selected item associated with the identifying data.

9. The method of claim 1, wherein the item information comprises price information for the selected item associated with the identifying data.

10. The method of claim 1, wherein at least one instance of the identifying data comprises a universal product code and another instance of the identifying data comprises text.

11. The method of claim 1, further comprising polling the user to determine the correct identifying data for the selected item if the output of the data recognition procedures results in conflicting identifying data.

12. The method of claim 1, wherein if the data recognition procedures output conflicting identifying data, the method further comprises obtaining item information for all of the items identified by the output of the data recognition procedures.

13. A computer system for communicating information regarding a selected item to a user present at a location of a first retail entity, wherein the system comprises a server operated by a second retail entity that is different than the first retail entity and the selected item is available for purchase at the second retail entity, the server being in communication with an imaging device of the user that is configured to capture an image of identifying data associated with the selected item, the server comprising:

a subsystem configured to receive an image from the imaging device of the user, wherein the image contains multiple instances of identifying data associated with the selected item;

a subsystem configured to extract the identifying data from each of the multiple instances in the image using a data recognition procedure that operates on an instance of the identifying data and produces an output;

a subsystem configured to compare the output of each of the data recognition procedures to corroborate the identification of the selected item that is obtained from each instance of the identifying data;

a subsystem configured to obtain item information associated with the selected item by using the corroborated identifying data when the data recognition procedures output identifying data that is corroborated, and otherwise obtaining the item information by determining a quality of the output of each of the data recognition procedures and based on the output having a higher quality, using the identifying data of the higher quality output to obtain the item information, wherein the item information is obtained from at least one resource;

a subsystem configured to communicate the item information directly to the imaging device of the user while the user remains present at the location of the first retail entity; and a subsystem with a storage database configured to store at least one of the instances of identifying data as profile information associated with the user, wherein the profile information is used to anticipate the user's purchasing interests and provide one or more targeted offers to the user to purchase an item based on the user's anticipated purchasing interests, wherein each of the subsystems of the server operate using a processor in communication with a memory unit of the server.

14. The system of claim 13, wherein the resource is a Web service providing information related to the selected item.

15. The system of claim 13, wherein the resource is a database storing information related to the selected item.

16. The system of claim 13, wherein the server subsystem that communicates the item information is further configured to communicate the item information in a format that enables generation of an audible signal through a speaker.

17. The system of claim 13, wherein the server subsystem that communicates the item information is further configured to communicate the item information in a format that enables generation of a visual output on a display.

18. The system of claim 13, wherein the server further comprises a subsystem configured to compile historical data based on a frequency of receipt of images from different imaging devices, said images containing identifying data associated with the selected item, and generate a report that forecasts future purchasing activity for the item based on the estimated consumer demand.

19. The system of claim 13, wherein the item information comprises rating information for the selected item associated with the identifying data.

20. The system of claim 13, wherein the item information comprises price information for the selected item associated with the identifying data.

21. The system of claim 13, wherein at least one instance of the identifying data comprises a universal product code and another instance of the identifying data comprises text.

22. The system of claim 13, wherein the server operated by the second retail entity is at a location remote from the location of the first retail entity.

23. A tangible computer-readable storage medium having a computer-executable component for communicating item information for a selected item to a user present at a location of a first retail entity, wherein the selected item is available for purchase at a second retail entity that is different than the first retail entity, and wherein the computer-executable component is executed by a server of the second retail entity and communicates the item information by:

receiving an image from an imaging device of the user, said image containing multiple instances of identifying data associated with the selected item;

for each of the multiple instances of identifying data, extracting the identifying data from the image using a data recognition procedure that produces an output;

comparing the output of each of the data recognition procedures to corroborate the identification of the selected item that is obtained from each instance of the identifying data;

determining whether the data recognition procedures output identifying data that is corroborated and based on that determination, when the identifying data is not corroborated, determining a quality of the output of each of the data recognition procedures and using identifying data of a higher quality output to obtain item information associated with the selected item, otherwise using the corroborated identifying data to obtain item information associated with the selected item;

communicating the item information directly from the server to the imaging device of the user while the user remains present at the location of the first retail entity; and storing at least one of the instances of identifying data as profile information in a database associated with the user, wherein the profile information is used to anticipate the user's purchasing interests and provide one or more targeted offers to the user to purchase an item based on the user's anticipated purchasing interests.

24. The computer-readable storage medium of claim 23, wherein the computer-executable component communicates the item information in a format that enables an audible output of the item information through a speaker.

25. The computer-readable storage medium of claim 23, wherein the computer-executable component communicates the item information in a format that enables a visual output of the item information on a display.

26. The computer-readable storage medium of claim 23, further comprising a computer-executable component for generating a forecast report, said computer-executable component generating the forecast report by:

compiling historical data based on a frequency of receipt of images from different imaging devices, said images containing identifying data associated with the selected item;

using the historical data to estimate consumer demand for the item; and generating a report that forecasts future purchasing activity for the item based on the estimated consumer demand.

27. The computer-readable storage medium of claim 23, wherein the item information comprises rating information for the selected item associated with the identifying data.

28. The computer-readable storage medium of claim 23, wherein the item information comprises price information for the selected item associated with the identifying data.

29. The computer-readable storage medium of claim 23, wherein at least one instance of the identifying data comprises a universal product code and another instance of the identifying data comprises text.

30. The computer-readable storage medium of claim 29, wherein extracting identifying data associated with the selected item from the image includes processing the universal product code with a UPC recognition program to produce a first output and processing the text with an optical character recognition program to produce a second output.

31. An integrated portable apparatus for obtaining item information for a selected item available for purchase at a location of a first retail entity, the apparatus comprising:

an input device configured to capture an image that contains multiple instances of identifying data associated with the selected item;

an output device for outputting item information for the selected item as obtained from a second retail entity that is different than the first retail entity;

a tangible storage medium for storing said identifying data and program instructions for processing the image; and a computer processor communicatively coupled to the input device, the output device, and the storage medium, for executing the program instructions that process the image by:

for each of the multiple instances of identifying data, extracting the identifying data from the image using a data recognition procedure that produces an output;

comparing the output of each of the data recognition procedures to corroborate the identification of the selected item that is obtained from each instance of the identifying data;

determining whether the data recognition procedures output identifying data that is corroborated and based on that determination, when the identifying data is not corroborated, determining a quality of the output of each of the data recognition procedures and outputting identifying data of a higher quality output on the output device to allow the user to review and edit the identifying data before the identifying data is communicated to a server operated by the second retail entity, otherwise outputting the corroborated identifying data on the output device to allow the user to review and edit the identifying data before the identifying data is communicated to the server operated by the second retail entity;

communicating the identifying data to the server operated by the second retail entity, wherein the selected item is available for purchase from the second retail entity;

storing at least one of the instances of identifying data as profile information in a database associated with the user, wherein the profile information is used to anticipate the user's purchasing interests and provide one or more targeted offers to the user to purchase an item based on the user's anticipated purchasing interests;

receiving, from the server of the second retail entity, item information for the selected item identified by the identifying data obtained from the image; and outputting the item information on the output device, wherein the output device communicates the item information to a user while the user remains at the location of the first retail entity.

32. The apparatus of claim 31, wherein at least one instance of the identifying data is barcode data and the computer processor extracts the barcode data by executing a barcode recognition program that operates on the image.

33. The apparatus of claim 31, wherein at least one instance of the identifying data is text data and the computer processor extracts the text data by executing an optical character recognition program that operates on the image.

34. The apparatus of claim 31, wherein the computer processor communicates the image to the server operated by the second retail entity at a location remote from the first retail entity for the server to extract the identifying data from the image.

35. The apparatus of claim 31, wherein the item information for the selected item is obtained by retrieving item information from a database maintained on behalf of the second retail entity, wherein the item information corresponds to the identifying data for the selected item.

* * * * *